United States Patent [19]

Reed

[11] Patent Number: 5,109,526

[45] Date of Patent: Apr. 28, 1992

[54] VEHICULAR REPEATER SYSTEM

[75] Inventor: John D. Reed, Arlington, Tex.

[73] Assignee: Motorola, Inc., Schaumburg, Ill.

[21] Appl. No.: 452,162

[22] Filed: Dec. 18, 1989

[51] Int. Cl.$^5$ ............................................. H04B 7/15
[52] U.S. Cl. ..................................... 455/11.1; 455/15; 455/54.1
[58] Field of Search ....................... 455/11, 15, 17, 50, 455/54, 56, 19, 218, 223

[56] References Cited

U.S. PATENT DOCUMENTS

| | | | |
|---|---|---|---|
| 4,056,779 | 11/1977 | Toler | 455/19 |
| 4,056,780 | 11/1977 | Faulkner | 455/11 |
| 4,234,959 | 11/1980 | Andrea, III et al. | 455/11 |
| 4,539,706 | 9/1985 | Mears et al. | 455/11 |
| 4,615,028 | 9/1986 | Lewis et al. | 370/110.1 |

OTHER PUBLICATIONS

Beaman, "Vehicular Mounted Repeater in Emergency Medical Services (EMS) Communications", Nov. 1979, pp. 307–310.

Primary Examiner—Reinhard J. Eisenzopf
Assistant Examiner—Edward Urban
Attorney, Agent, or Firm—Thomas G. Berry; Daniel K. Nichols; Pedro P. Hernandez

[57] ABSTRACT

A vehicular repeater interrupts the repeated audio and a timing signal that is transmitted to the portable. The timing signal is used by the portable to determine when the vehicular repeater will next interrupt the repeated information. Accordingly, the portable synchronizes its transmission of a signal to coincide with the next interruption. If no transmission is desired, the portable operates to mute the portable's speaker during the interruption to prevent noise bursts. Upon the initial recipt of a portable+s transmission signal, the vehicular repeater extends the interruption interval to verify the portable's transmission signal.

13 Claims, 6 Drawing Sheets

VEHICULAR REPEATER SYSTEM

TECHNICAL FIELD

This invention related generally to vehicular repeater systems, and more particularly to a method and apparatus for improving the performance of such systems and the portable units operating therein.

BACKGROUND ART

Vehicular repeaters operate to allow a portable unit to communicate via the vehicular repeater with a base unit. This arrangement increases the "talk-back" range of the portable by relaying upon the higher power transmitter of the vehicular repeater. Generally, however, vehicular repeater systems have an inherent detriment when communication is directed from the base through the vehicular repeater to the portable. This detriment stems from the simplex operation of the vehicular repeater. Typically, base units cause the vehicular repeater to be held in the transmitting-to-portable mode for a brief period at the end of each transmission. Accordingly, the vehicular repeater cannot receive a response transmission from the portable immediately following the conclusion of a voice message from the base due to this "hang time". Also, a portable operator may desire to have access at some time during a transmission for the vehicular repeater to transmit, for example, an emergency message. Thus, it is generally desirable to permit the portable to have priority since the portable operator is likely to be in a dangerous situation (for example a police officer or fireman). However, due to simplex operation, if the vehicular repeater is transmitting, it will not respond to transmissions from the portable.

To solve this access problem, some vehicular repeater designers have opted to create small "holes" (i.e., interruptions) in the repeated audio to the portable to permit the vehicular repeater to switch to its receiving mode in an attempt to detect a transmitted carrier from the portable. In this way, if the portable should transmit during a message from the base the portable transmission may be given priority (if its transmitter carrier is detected) and be permitted to take control of the vehicular repeater.

While generally effective, contemporary vehicular repeater systems suffer from two detriments which are typically balanced against one another in any particular implementation. The first detriment is that during the interruptions in the repeated audio (during which time a vehicular repeater looks for the transmitted carrier from the portable), an unsquelched noise burst is apparent in the speaker of the portable. The second detriment stems from the recognition of those skilled in the art that carrier detection circuits are prone to falsing. Since these noise burst are generally undesirable, and may impair the proper reception of the message, it is desirable to keep the interruptions as brief as possible. However, a shorter detection interval reduces the time that the carrier detection circuit has to examine the incoming signal, and therefore, increases the likehood of falsing. Additionally, falsing may occur in situations where several portables are clustered in a small area and are talking on the same frequency. A typical situation comprises police or fire scenes, which may involve several individuals using portable radios. In these situations, stray signals from portables on the same frequency may be received by a vehicular repeater other than the one actually associated with the transmitting portable. These falsing errors cause an improper seizure of the vehicular repeater which interrupts the message from the base and prevents reception by the portable.

Accordingly, there is a need in the art for a vehicular repeater system that minimizes or eliminates the falsing and noise burst detriments of the prior art thereby providing improved system and portable performance.

SUMMARY OF THE INVENTION

Briefly, according to the invention, a vehicular repeater periodically briefly interrupts the repeated audio and a timing signal is transmitted to the portable. The timing signal is used by the portable to determine when the vehicular repeater will next interrupt the repeated information. If no transmission is desired, the portable operates to mute the portable's speaker during the interruption to prevent noise bursts. Conversely, if desiring to transmit, the portable synchronizes the transmission of a signal to coincide with the next interruption. Upon the initial detection of at least a portion of the portable's transmitted signal, the vehicular repeater extends the interruption interval to facilitate reception of the portable's signal.

DETAILED DESCRIPTION OF THE PREFERRED EMBODIMENT

Figure 1:
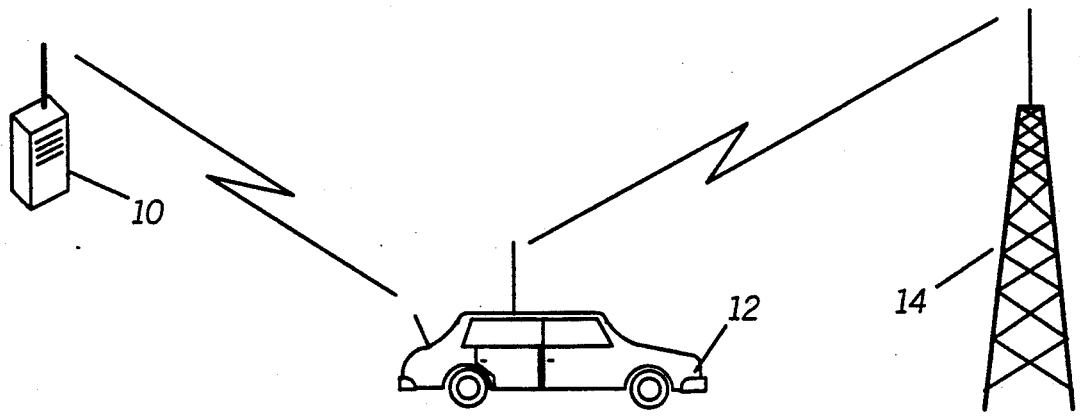
FIG. 1 is an illustration of a vehicular repeater system in which the present invention may be advantageously employed.

Referring to FIG. 1, a vehicular repeater system includes a portable unit (10) that utilizes a higher power radio (repeater) installed in a vehicle. This vehicular repeater (12) re-transmits information from the portable 10 to a base unit (or base repeater) (14). This operation extends the "talk-back" (i.e., portable-to-base) transmission range of the portable unit.

According to the invention, the vehicular repeater operates to create "holes" (i.e., interruptions) in the transmissions while in the base-to-portable mode These "holes" permit the vehicular repeater to switch to its receiving mode to detect a signal from the portable. (10). In this way, if the portable should transmit during a message from the base the portable transmission will be given priority and be permitted to take control of the vehicular repeater (12). Additionally, the vehicular repeater (12) sends timing information to the portable (10). The portable (10) uses this timing information to synchronously mute the portable's speaker so that the operator will not be annoyed by noise bursts. Moreover, this timing information is used to coordinate portable transmissions so as to most effectively capture control of the vehicular repeater (12).

Figure 2:
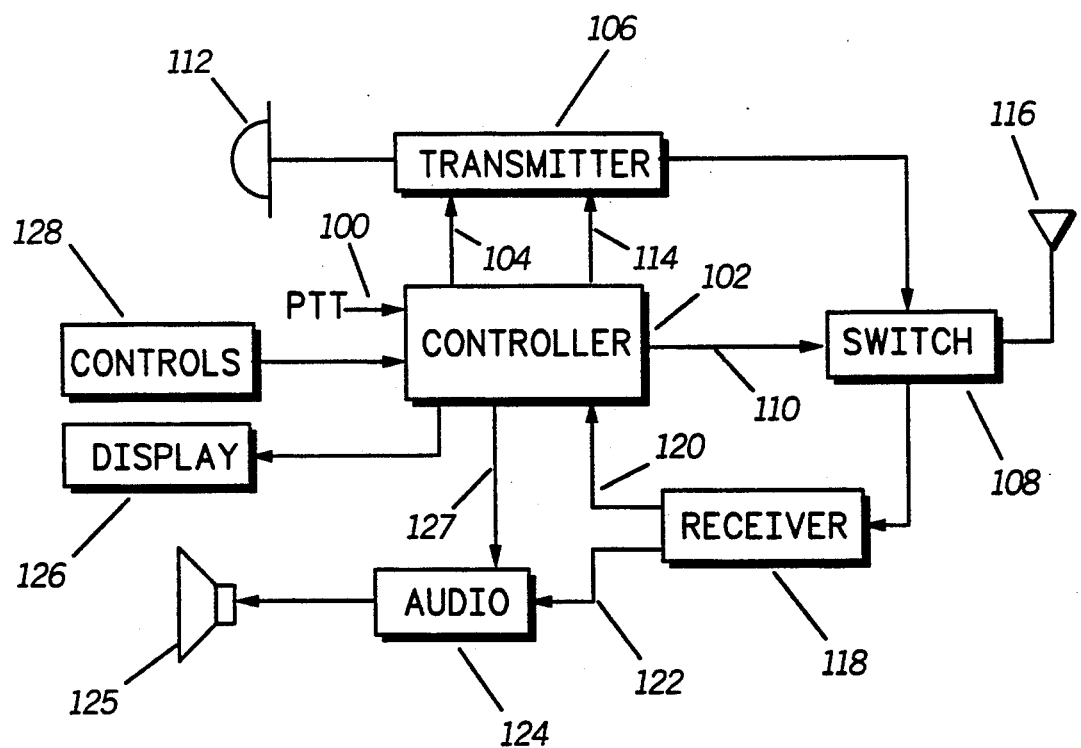
FIG. 2 is a block diagram of the portable unit of FIG. 1.

Referring to FIG. 2, the portable unit (10) is illustrated in block diagram form. To transmit a signal, an operation actives a push-to-talk (PTT) switch, which asserts a PTT signal (100) to a controller (102). Upon detection of the PTT signal (100), the controller (102) activates (104) a transmitter (106). Additionally, the controller operates (110) a switch (108) so that signals eminating from the transmitter (106) are coupled to an antenna (116). Thereafter, signals (e.g., voice) impressed upon a microphone (112) will be transmitted from the portable unit to the vehicular repeater for re-transmission to the base unit. Also, data information (e.g., status, inquiry, switch closures from the controls (128), etc.) may be provided (114) to the transmitter (106) for transmission.

To receive a message, the controller (102) operates (110) the switch (108) so that the antenna (116) provides signals to a receiver (118). The receiver routes recovered digital information (e.g., data messages, status, and the timing information) to the controller (102), while audio information (e.g., voice) is provided (122) to audio circuits (124) for appropriate filtering and amplification before being presented to the operation via a speaker (125). Conversely, recovered data messages may be presented to the operator via a display (126).

According to the invention, the controller (102) operates in the receive mode to use the timing information transmitted by the vehicular repeater to mute (127) the recovered audio, so that the operator will not be annoyed with noise bursts that occur due to "holes" in the received signal. These holes are created by the vehicular repeater (12) when it is determining whether the portable unit (10) is transmitting. Additionally, this timing signal is processed by the controller (102) to coordinate the activation (104) of the transmitter (106) so that switch closure or PTT activation information may be synchronized to the time when the vehicular repeater is looking for portable transmissions. In this way, system efficiency and effectiveness is improved.

Figure 3:
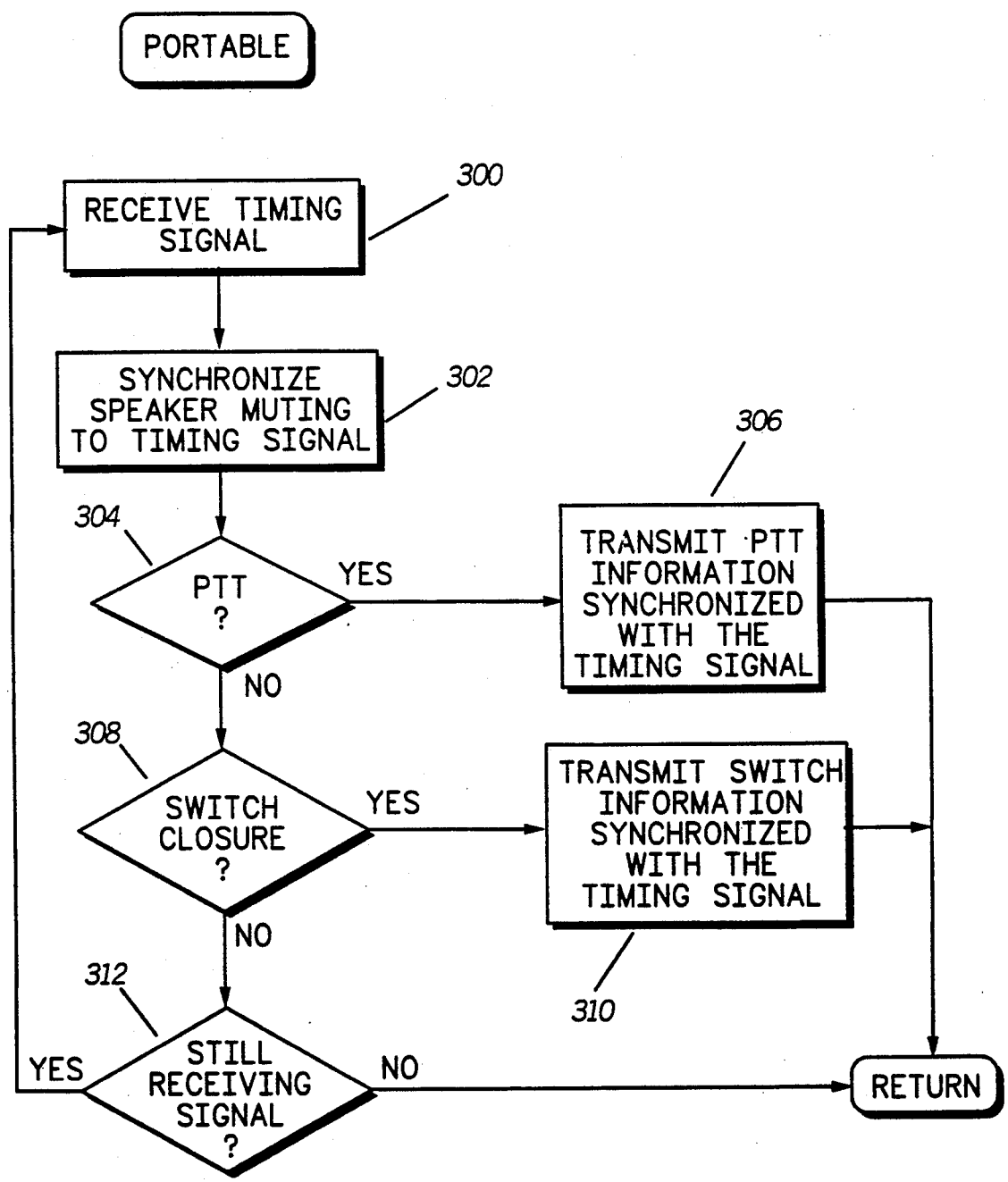
FIG. 3 is a flow diagram illustrating the operation of the portable unit of FIG. 2.

Referring to FIG. 3, a flow diagram illustrates the preferred operation of the portable unit (10) begins in step 300, where the timing information is extracted and used to synchronize the muting of the portable's speaker (step 302). In decision 304, the portable determines whether the operator has activated the PTT switch to transmit. If so, the portable unit synchronizes the transmission to the timing information (step 306) so as to most effectively capture control of the vehicular repeater. That is, the portable's actual transmission may not occur when the PTT switch is activated, but rather, at the next available transmit time as determined by the timing information received from the vehicular repeater.

If the determination of decision 304 is that the PTT switch was not activated, decision 308 determines whether some other control or switch was activated. If so, this information is transmitted synchronized to the timing signal (step 310). Conversely, if no action has been taken by the portable operator, decision 312 determines whether the portable is still receiving transmissions from the vehicular repeater. If so, the routine returns to step 300.

Figure 4:
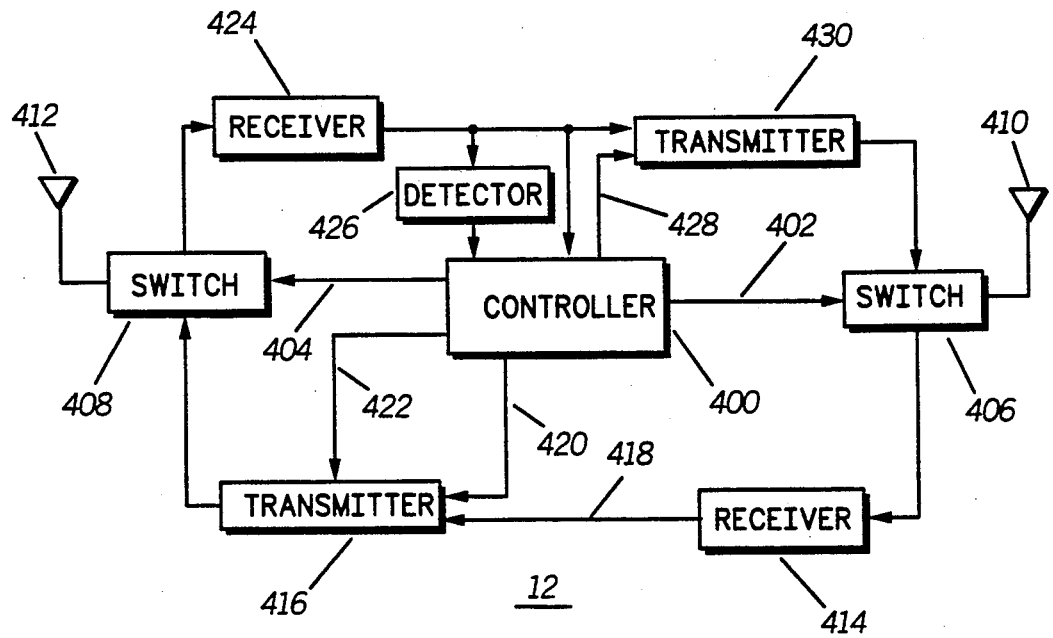
FIG. 4 is a block diagram of the vehicular repeater of FIG. 1.

Referring to FIG. 4, a block diagram of the vehicular repeater (12) is shown. In the base-to-portable mode, a controller (400) controls (402 and 404) switches (406 and 408) that couple antennas (410 and 412) respectively to a base receiver (414) and a portable transmitter (416). In this mode, information received from the base (418) is sent to the portable unit, together with the timing information (420). Synchronously with the timing information, the portable transmitter (416) is interrupted (422), and the controller (400) operates the switch (408) so that the antenna (412) is coupled to a portable receiver (424). This allows the controller to attempt to detect (426) whether the portable unit is transmitting during the interruption.

If no transmissions are detected, the antenna (412) is re-coupled (via the switch 408) to the portable transmitter (416) and the base information (418) continues to be sent to the portable unit. Conversely, if a portable transmission is detected, the interruption of the base information is extended (420) to enable the controller to process a longer sample of the incoming portable transmission. This process allows the controller (400) a verification time following the initial signal detection so that an initial false detection does not cause reversal of the direction of communication. However, if portable transmission is verified, the controller (400) must determine whether the portable unit desires to transmit information to the base unit, or has sent updated status or inquiry information. If the portable is providing information to the repeater, the controller processes and/or stores the information as appropriate. However, if the portable is transmitting to the base, the controller activates (428) a base transmitter (430) and operates (402) the switch (406) so as to couple the base transmitter to the antenna (410). In this way, the portable is given transmission priority in the communication system of the present invention.

Figure 5A:
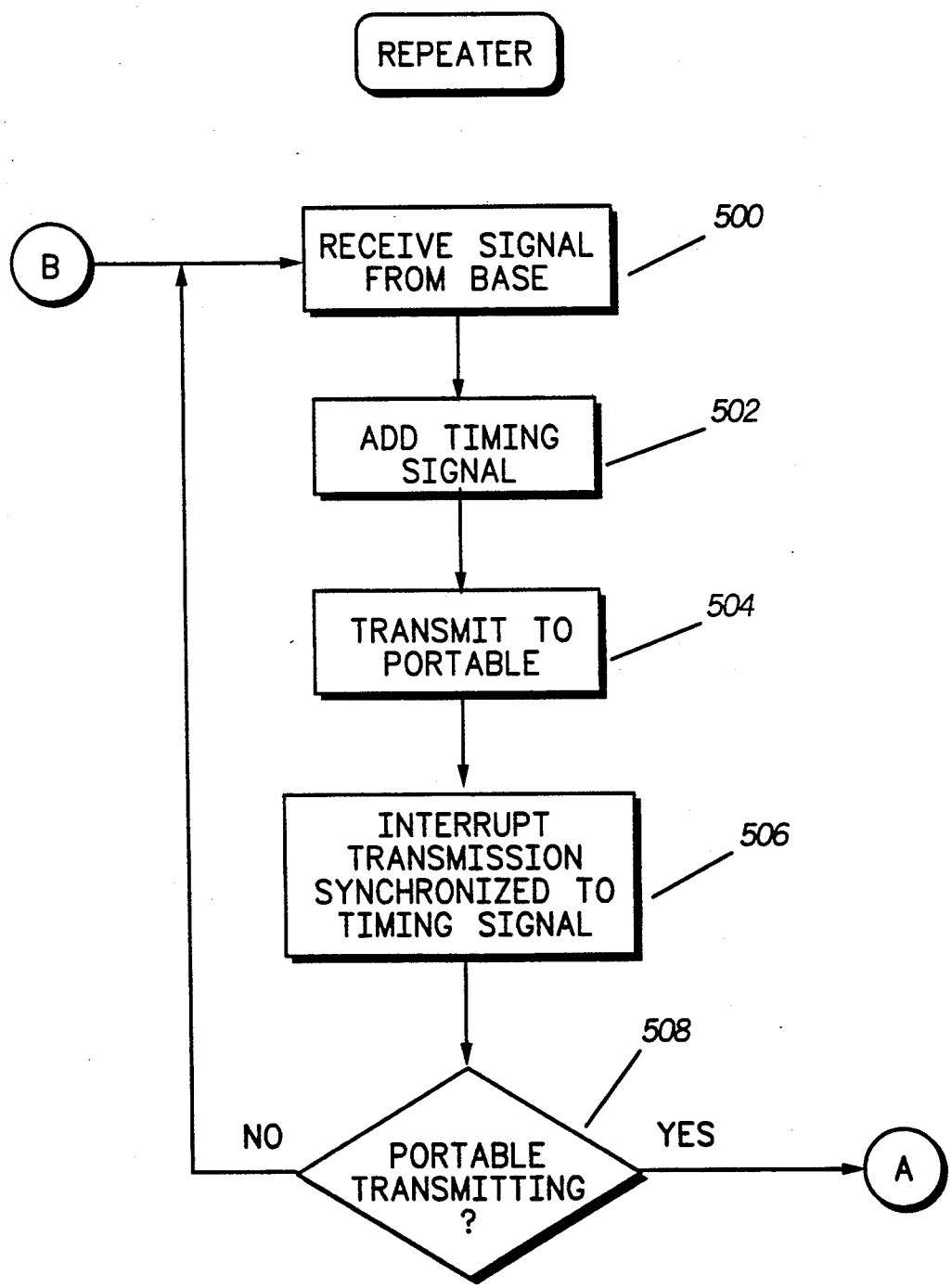
FIGS. 5a and 5b are flow diagrams illustrating the operation of the vehicular repeater of FIG. 4.
Figure 5B:
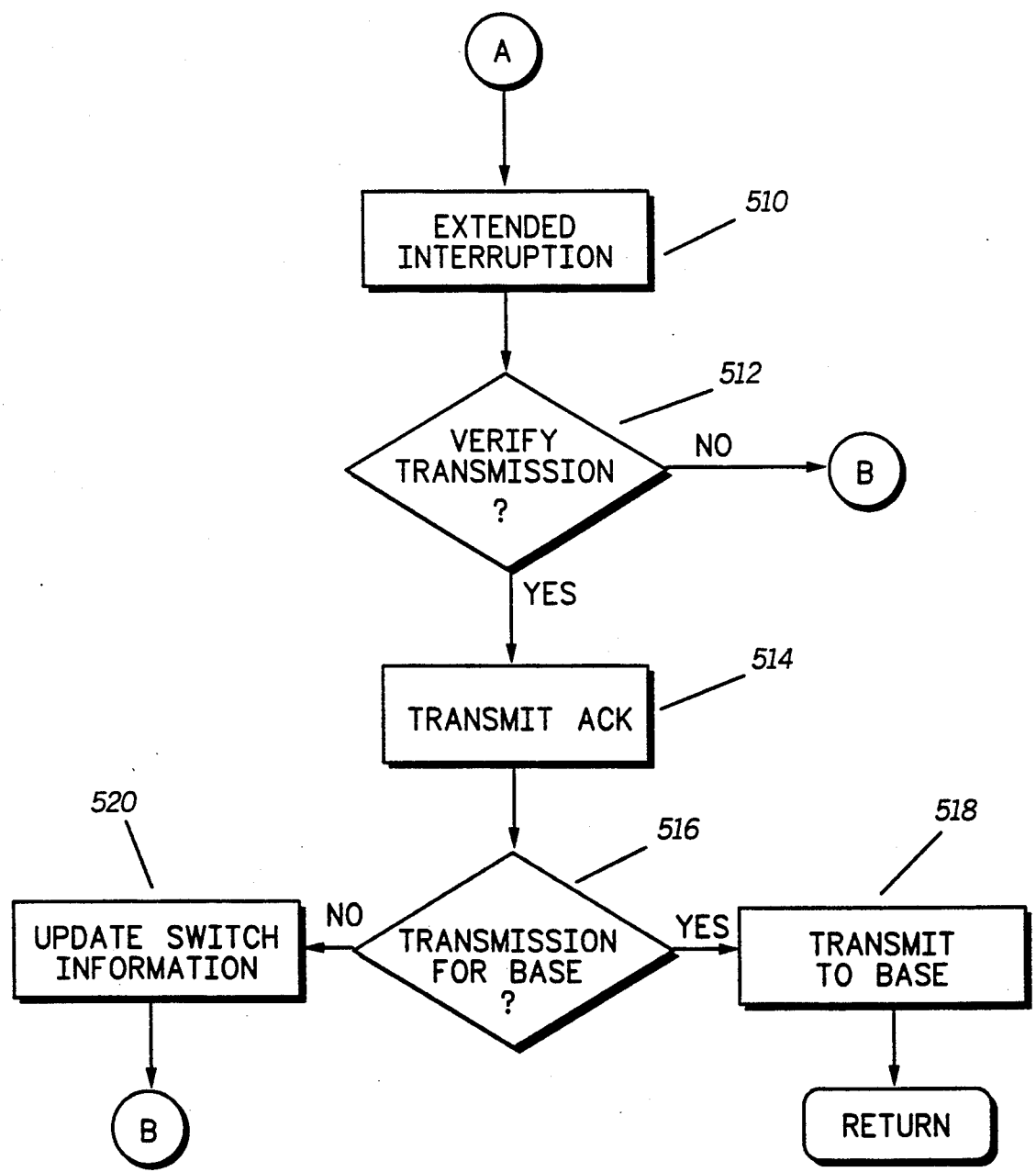

Referring to FIGS. 5a and 5b, a flow diagram illustrating the operation of the vehicular repeater is shown. The routine begins in step 500, where the vehicular repeater receives a message from the base for re-transmission to the portable. Next, timing information is added to the received signal (step 502), and the combined signal is transmitted to the portable unit (step 504). Synchronously with the timing information, this transmission is interrupted (step 506), and the vehicular repeater operates to determine whether the portable is transmitting (decision 508). If so, the interruption of the base-to-portable transmission is extended (step 510) to enable the controller to verify that the portable is indeed transmitting (decision 512). If the portable was not transmitting, the routine loops back to step 500. Conversely, if the portable is transmitting, the vehicular repeater transmits an acknowledge signal (step 514) and determines whether the portable's transmission is for the base unit (decision 516). If so, the repeater gives transmission priority to the portable unit and transmits the portable's message to the base (step 518). Otherwise, the information transmitted by the portable will be switch, status or inquiry information for the repeater. In this case, the information is updated or processed by the repeater (step 520) and the repeater begins to re-transmit the base information to the portable. Thus, by providing the controller an extended verification time, the present invention minimizes falsing without unduly interrupting base transmissions.

Figure 6A:
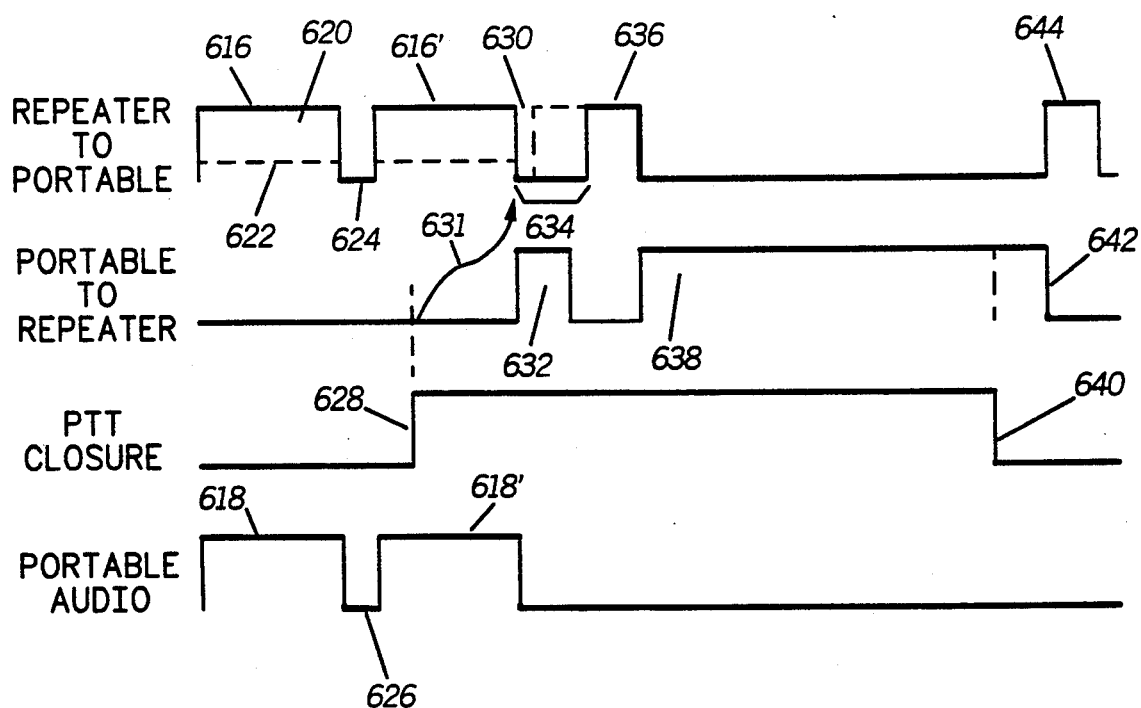
FIG. 6a is a timing diagram illustrating the portable-to-mobile voice operation of the present invention.

Referring to FIG. 6a, a timing diagram illustrating the voice operation of the present invention is shown. Initially, the vehicular repeater (12) is transmitting (i.e., repeating a message from the base (14)), and the portable (10) is receiving (618). The transmitted information (616) from the vehicular repeater comprises an audio information signal (620), and timing information (622), which may comprise one or more low speed digital codes. Preferably, these codes are selected to operate as an identification means, and to enable the portable (10) to determine when the next interruption (624, 626) will occur. With this information, the portable (10) may synchronize a transmission or mute its speaker to prevent an audible noise burst. Additionally, other information may be coded into or transmitted with the timing signal, such as, for example, control, audio processing, or status information. According to the present invention, the interruptions occur periodically at approximately three times per second. Preferably, the interruption (624) has a duration of 15 ms., although other durations are possible.

Assuming that the portable (10) desires to transmit a voice message, the operator could assert a push-to-talk (PTT) switch to asserted a PTT signal (628). Ordinarily, upon the assertion of the PTT switch, the portable would immediately begin transmitting. However, in this case, such activity would be futile since the vehicular repeater (12) is transmitting (616') (i.e., repeating) and not listening to the portable. However, since the portable (10) may determine when the next interruption (630) will occur (due to the timing signal (622)), transmission is delayed (631) until the next interruption (630), at which time the portable transmits a signal (632). Preferably, the portable preambles its signal with an easily detected code, such as an alternating "1", "0" pattern.

The vehicular repeater (12) makes an initial determination during the interruption (630) as to whether a valid signal has been received from the portable by examining at least a portion (i.e., at least some of the preamble) of the portable's transmission. Optionally, a conventional carrier detect dievice may be used in conjunction with the present invention if desired in a particular implementation. If the vehicular repeater (12) determines that the signal decoded during the interruption (630) is incorrect, the repeated information resumes, and transmission continues from base-to-portable. Conversely, if a received message appears vaild, the vehicular repeater (12) operates to extend the interruption (634), to facilitate the complete (verify) reception of the portable's signal. The complete signal (632) may include the portable's identification code and other control or signalling information. After decoding the portable's signal, the vehicular repeater (12) responds with a "go ahead" packet (636). Upon receipt of the "go ahead" packet, the portable transmits (638) a voice message to be repeated to the base (14). After release of the PTT switch (640), which may follow shortly after the PTT switch closure or an extended time later, the portable transmits an end-of-message (EOM) code (642). Upon receipt of the EOM code, the vehicular repeater acknowledges (644) receipt of the portable's information. In this way, if a portable roams out of transmission range, or if transmission is blocked by some obstruction, the portable operator may be signalled to re-transmit the information when communication is reestablished.

At each interruption, the vehicular repeater (12) looks for a signal (632) transmitted from the portable (10). Preferably, the portable's transmitted signal (632) includes an identification (ID) code, which may be preambled by synchronization or other information. In this way, falsing problems caused by mulitple portables transmitting on the same frequency in a localized area are avoided since if the vehicular repeater determines that a received signal (632) has an incorrect ID code, the extended interruption (634) is ended and transmission to the portable (10) resumes. Further, since the timing signal (622) preferably contains an ID code, only the portable associated with a particlular vehicular repeater will be able to determine exactly when the next interruption will occur. Therefore, the possibility of stray signals causing a false interruption extensions are minimal. However, assuming that, by coincidence, two or more portables (or other mobiles) are transmitting on the same frequency and during the same interruptions (634) (and that this situation leads to several extended interruptions), the present invention contemplates that the vehicular repeater (12) may command its associated portable (10) to change frequency via a signal inserted into the timing information (622) or by sending a command (as shown in FIG. 6c). A change of frequency could also be made to avoid an interference condition if a strong interfering carrier is detected in several interrupt intervals (624) irrespective of whether an extended interruption (634) has occurred. In this way, several portable and mobile units may be operating in the same area and not interfere with one another.

Optionally, after receiving a transmission from its associated portable (10), vehicular repeater (12) may then determine the signal strength value of the received transmission(s) and transmit a command to said corresponding portable (10) directing it to vary one or more of its operational parameters. The vehicular repeater (12) can transmit this command to the portable (10) if the signal strength value that was measured by the repeater (12) was at least equal to a predetermined threshold.

Figure 6B:
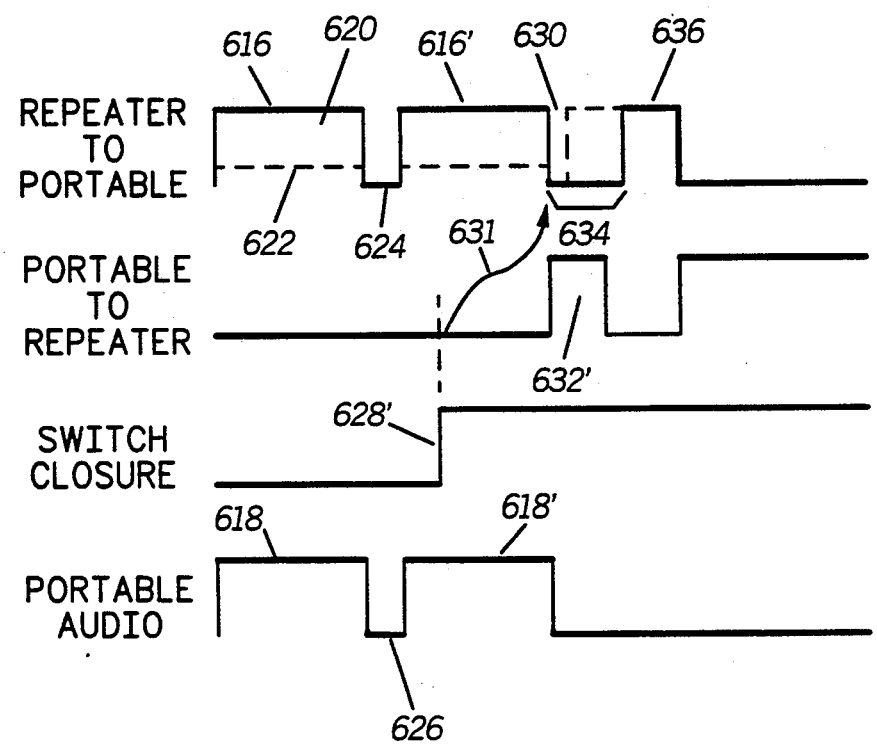
FIG. 6b is a timing diagram illustrating the portable-to-mobile data operation of the present invention.
Figure 6C:
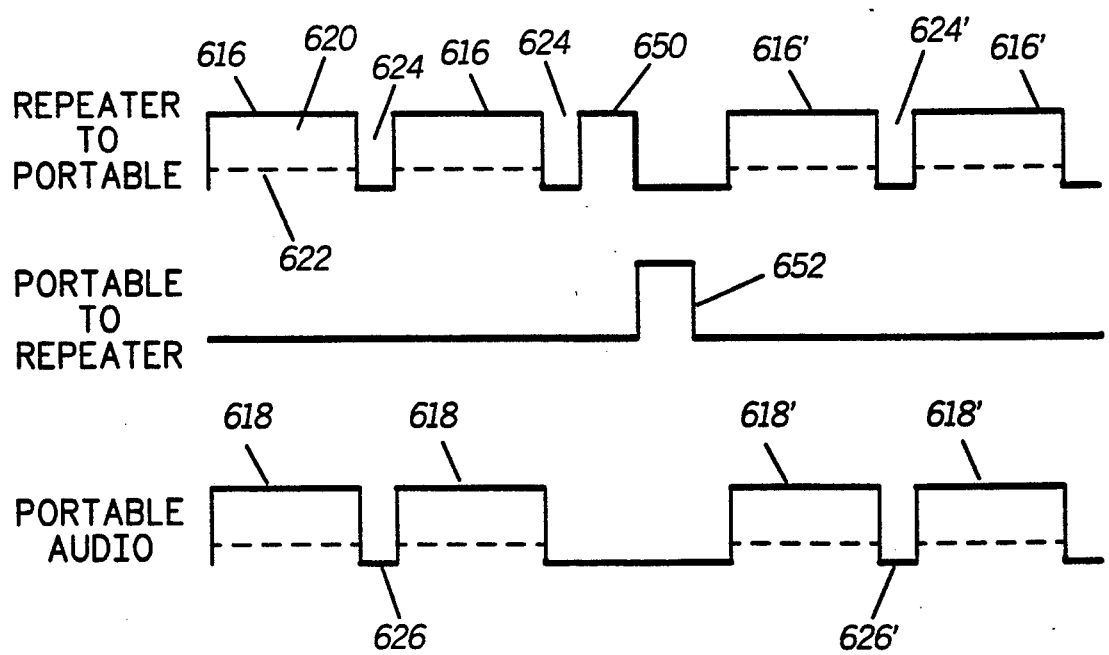
FIG. 6c is a timing diagram illustrating the mobile-to-portable data operation of the present invention.

Referring now to FIG. 6b, a timing diagram illustrating the data operation of the present invention is shown. As used herein, the data operation of the present invention refers to any information signal transmitted or decoded in a data format, including, but not limited to, test, command codes or status updates. Assuming now that the portable (10) desires to transmit data infomation, the operator would assert some switch closure (628'). For example, the portable may have asserted a switch that automatically sends a predetermined status message. Alternately, the portable operator may wish to change the state of some operational parameter of the vehicular repeater (12), such as, for example, frequency, signalling, or the like, in which case some other switch may be activated. Ordinarily, upon the assertion of a switch, the portable would immediately begin transmitting information. However, as discussed above, such activity would be futile since the vehicular repeater (12) is transmitting (616') (i.e., repeating) and not listening to the portable. However, since the portable (10) may determine when the next interruption (630) will occur (due to the timing signal (622)), transmission is delayed (631) until the next interruption (630), at which time the portable transmits the data information signal (623'). Preferably, the portable preambles this signal with an easily detected code, such as an alternating "1", "0" pattern.

The vehicular repeater (12) operates in a similar manner as discussed for voice messages to make an inital determination during the interruption (630) as to whether a valid signal has been received from the portable. This done by examining at least a portion (i.e., at least some of the preamble) of the portable's transmission. If the vehicular repeater (12) determines that the signal decoded during the interruption (630) is incorrect, the repeated information resumes, and transmission continues from base-to-portable. Conversely, if a received message appears valid, the vehicular repeater (12) operates to extend the interruption (634), to facilitate the complete reception of the portable's signal. The complete signal (632') may also include the portable's identification code. After decoding the portable's signal, the vehicular repeater (12) responds with an acknowledge signal (636). Following this information interchange, the vehicular repeater would resume transmitting (616) and the portable would resume receiving (618).

Referring now to FIG. 6c, a timing diagram illustrating mobile-to-portable data operation is shown. As discussed above, the vehicular repeater (12) is initially transmitting (i.e., repeating a message from the base (14)), and the portable (10) is receiving (628). The transmitted information (616) from the vehicular repeater comprises an audio information signal (620), and a timing signal (612), which may comprise one or more low speed digital codes. According to the invention, these codes are selected to operate as an identification means, and to enable the portable (10) to determine when the next interruption (624) will occur. With this information, the portable (10) may synchronize a transmission or mute its speaker to prevent an audible noise burst. However, the present invention comtemplates that the mobile unit may have to itself interrupt the repeated communications (616) and transmit an information signal (650). This information may include command and/or status information essential to proper communications. Accordingly, the information signal (650) may be transmitted by the mobile to the portable at any time, however, the mobile may not begin its transmission immediately before or during an interruption (624), since the portable (10) may be transmitting during the interruption. Thus, the information signal (650) may begin after the conclusion of a non-extended interruption. Alternately, the repeated signal (626) may be interrupted at any time so long as it is not immediately before the beginning of the next scheduled interruption interval.

After receipt of the information signal (650), the present invention contemplates that the mobile wait a predetermined time period before resuming repeating the base signal (616'). This delay enables the portable to quickly respond with an acknowledge signal (652), irrespective of where the next interruption would have occurred. In this way, communication through-put is improved an spectral efficiency is enhanced. After resumption of the repeated base signal (616'), the portable reverts to timing all other transmissions to the periodic interruption intervals (624').

In summary, the present invention affords the portable (10) an opportunity to interrupt. By timing the portable transmissions to the period interruptions, a reliable and efficient communication system is provided. The vehicular repeater's operation of the initial detection followed by the extension of the interruption to confirm the validity of the portable's interruption, virtually precludes the possibility of falsing. Since the mobile and portable may communicating control and status parameters between one another, local interference may be minimized or eliminated if two or more portables or mobiles are operating on the same frequency. Further, in the case of mobile-to-portable data transmission, communication through-put is maximized by transmitting substantially irrespective of where the next interruptions will occur, the noise may be muted so as not to distract or impair the reception of the message from the base (14).

What is claimed is:

1. In a vehicular repeater system wherein at least one portable unit may communicate through at least one repeater installed in a vehicle, and improved signalling method comprising the steps of:
   at said at least one vehicular repeater:
   (a) transmitting an information signal including at least a timing signal to said at least one portable unit;
   (b) interrupting said transmission to said at least one portable unit to provide an interruption period;
   at a portable unit:
   (a) receiving fromsaid least one vehicular repeater said information signal including the timing signal;
   (b) extracting the timing from the information signal in order to synchronize the portable unit as to when the at least one vehicular repeater will interrupt said information signal transmission;
   (c) muting the portable unit during the interruption period of the at least one vehicular repeater in response to said timing signal.

2. In a vehicular repeater system wherein at least one portable unit may communicate through at least one repeater installed in a vehicle, an improved signalling method comprising the steps of:
   at said at least one vehicular repeater:
   (a) transmitting an information signal including at least a timing signal to said at least one portable unit;
   (b) interrupting said transmission to said at least one portable unit to provide an interruption period;
   (c) determining during said interruption period whether a message was received from said portable unit;
   (d) extending said interruption period to complete reception of said message from said at least one portable unit if said at least one portable unit has transmitted, else resuming said transmission to said at least one portable unit;
   at said at least one portable unit:
   (a) receiving said information signal including at least a timing signal from said at least one vehicular repeater;
   (b) transmitting a signal including said message to said at least one vehicular repeater at a time determined in response to said timing signal, regardless of whether said at least one vehicular repeater has transmitted a complete message.

3. The method of claim 2, which includes the further step at the at least one vehicular repeater of: (e) abandoning said transmission to said at least one portable unit and repeating a message from said at least one portable unit to a radio frequency receiver if said at least one portable unit is transmitting.

4. The method of claim 2, which includes the further step at the at least one vehicular repeater of: (e) abandoning said transmission to said at least one portable unit and receiving a message from said at least one portable unit if said at least one portable unit is transmitting.

5. The method of claim 2, which includes the further steps at the vehicular repeater of:
   (e) abandoning said transmission to said at least one portable unit;
   (f) receiving a message from said at least one portable unit;

(g) acknowledging receipt of said message from said at least one portable unit.

6. The method of claim 5, which includes the further step at the vehicular repeater of receiving an end-of-message code from said at least one portable unit.

7. In a vehicular repeater system wherein at least one portable unit may communicate through at least one repeater installed in a vehicle, an improved signalling method comprising the steps of:
at said at least one vehicular repeater:
(a) transmitting an information signal including at reast a timing signal to said least one portable unit;
(b) interrupting said transmission to said at least one portable unit to provide an interruption period;
(c) determining during said interruption period whether a message has been received from said at least one portable unit;
(d) extending said interruption period to complete reception of said message from said at least one portable unit if said at least one portable unit has transmitted, else resuming said transmission to said at least one portable unit;
at said at least one portable unit:
(a) receiving said information signal including said timing signal from said at least one vehicular repeater;
(b) preventing at least a portion of said information signal from being presented to an operator in response to said timing signal in order to allow the portable unit to transmit a signal including said message to said at least one vehicular repeater regardless of whether said at least one vehicular repeater has transmitted a complete message said transmission by at least one portable being synchronized by the timing signal.

8. In a vehicular repeater system wherein a portable unit and a repeater installed in a vehicle are paired for communication via a common identification code, and several such portable-repeater pairs may be operating in a localized area, a method to avoid interference comprising the steps of:
at any of said repeaters:
(a) transmitting an information signal including at least a timing signal to a corresponding portable unit;
(b) interrupting said transmission to said corresponding portable unit to provide an interruption period;
(c) determining during said interruption period whether said corresponding portable unit or any other portable or mobile unit has transmitted a message during said interruption period;
(d) extending said interruption period to completely receive said message transmitted from said corresponding portable unit if said corresponding portable unit has transmitted, else resuming said transmission to said at least one portable unit;
(e) transmitting a command to said corresponding portable unit to vary one or more operational parameters if portable units other than said corresponding portable unit or any other mobile units transmit during said interruption.

9. In a vehicular repeater system wherein at least one portable unit may communicate through at least one repeater installed in a vehicle, an improved signalling method comprising the steps of:
at said at least one vehicular repeater:
(a) transmitting a first information signal including at least a timing signal to said at least one portable unit;
(b) interrupting, periodically, said transmission to said at least one portable unit to provide interruption periods, and determining whether said at least one portable unit has transmitted during one of said periodic interruption periods;
(c) transmitting a second information signal to said at least one portable unit provided that such transmission of said second information signal is not initiated during or within a predetermined time inerval prior to the next occurrence of said periodic interruption periods;
at said at least one portable unit:
(a) receiving said first information signal including at least a timing signal from said at least one vehicular repeater;
(b) operating upon said timing signal to synchronize transmissions to said at least one vehicular repeater;
(c) receiving said second information signal;
(d) transmitting an acknowledge signal in response to receiving said second information signal regardless of whether said transmission of said acknowledge signal would be synchronized to said timing signal.

10. In a vehicular repeater system wherein a portable unit and a repeater installed in a vehicle are paired for communication via a common identification code, and several such portable-repeater pairs may be operating in a localized area, a method to avoid interference comprising the steps of:
at any of said repeaters;
(a) transmitting an information signal including at least a timing signal to a corresponding portable unit;
(b) interrupting said transmission to said corresponding portable unit to provide an interruption period said interruption period being synchronized to the portable unit via said timing signal;
(c) determining during said interruption period whether any other portable or mobile unit has transmitted a message;
(d) determining a signal strength value for any of said transmissions of step (c);
(e) transmitting a command to said corresponding portable unit to vary one or more operational parameters if said signal strength value is at least equal to a predetermined threshold.

11. In a vehicular repeater system wherein at least one portable unit may communicate through at least one repeater installed in a vehicle, the at least one vehicular repeater being capable of transmitting an information signal including at least a timing signal to the at least one portable and is also capable of interrupting said transmission to said at least one portable unit to provide an interruption period, an improved portable unit, comprising:
means for receiving from said at least one vehicular repeater said information signal including at least a timing signal;
means for extracting the timing signal from the information signal in order to synchronize the portable unit to the at least one vehicular repeater as to when the at least one vehicular repeater will interrupt said information signal transmission:
means for muting the portable unit during the interruption period of the at least one vehicular repeater in response to at least said timing signal.

12. In a vehicular repeater system wherein at least one portable unit may communicate through at least one repeater installed in a vehicle, the at least one vehicular repeater being capable of transmitting an information signal including at least a timing signal to the at least one portable and is also capable of interrupting said transmission to said at least one portable unit to provide an interruption period, an improved portable unit, comprising:

means for receiving from said at least one vehicular repeater the information signal including at least a timing signal, and at least a portion of the message;

means for extracting the timing signal from the information signal in order to synchronize the portable unit to the at least one vehicular repeater as to when the at least one vehicular repeater will interrupt said information signal transmission: and means for transmitting a signal to said at least one vehicular repeater at a time during which the vehicular repeater is in an interruption period determined in response to said timing signal, regardless of whether said at least one vehicular repeater has transmitted a complete message.

13. In a vehicular repeater system wherein at least one portable unit may communicate through at least one repeater installed in a vehicle, an improved vehicular repeater, comprising:

means for transmitting an information signal including at least a timing signal to said at least one portable unit;

means for interrupting said transmission to said at least one portable unit to provide an interruption period, said interruption period being synchronized to the portable unit via the timing signal which was transmitted to the at least one portable unit, said timing signal informing the at least one portable unit as to when the interruption period is to occur;

means for determining during said interruption period whether a message was received from said portable unit;

means for extending said interruption period to complete reception of said message from said at least one portable unit if said at least one portable unit has transmitted, else resuming said transmission to said at least one portable unit.

* * * * *